W. H. PEIRCE,

Assignor, by mesne assignments, to R. A. Cook.

Meat and Vegetable Cutter.

No. 9,580. Reissued Feb. 22, 1881.

Witnesses.
E. S. Hainer,
M. L. Shinn

Inventor.
William H. Peirce
by his attys
Geo. Ellsworth

N. PETERS, PHOTO-LITHOGRAPHER, WASHINGTON, D. C.

UNITED STATES PATENT OFFICE.

WILLIAM H. PEIRCE, OF BANGOR, MAINE, ASSIGNOR, BY MESNE ASSIGNMENTS, TO RUTH A. COOK, OF WOONSOCKET, RHODE ISLAND.

MEAT AND VEGETABLE CUTTER.

SPECIFICATION forming part of Reissued Letters Patent No. 9,580, dated February 22, 1881.

Original No. 114,594, dated May 9, 1871. Application for reissue filed May 21, 1879.

*To all whom it may concern:*

Be it known that I, WILLIAM H. PEIRCE, of Bangor, in the county of Penobscot, in the State of Maine, have invented a new and useful Improved Meat and Vegetable Chopper, of which the following is a specification.

This invention relates to that class of machines which are employed for mincing or fine-cutting meat, vegetables, and other articles of food; and it consists in certain improvements upon the machine originally patented by me August 31, 1869, No. 94,237, which I will now proceed to describe, and point out particularly in the claims.

Figure 1:
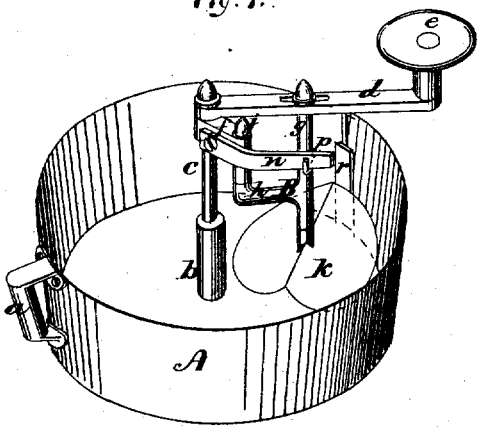
Figure 2:
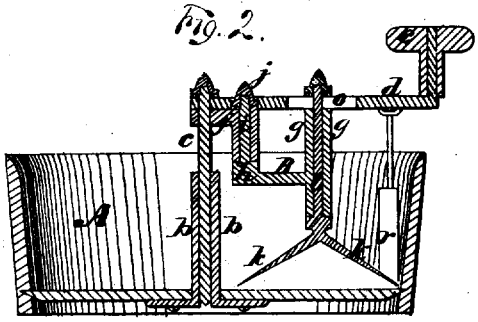

In the accompanying drawings, Figure 1 is a perspective view. Fig. 2 is a vertical section taken through the horizontal arm or sweep.

Similar letters of reference indicate the same parts.

A represents the tub or vessel, which is cylindrical or circular in form, and of a suitable depth for the use intended.

*a* is a handle secured to the tray or bowl A, as shown, for convenience in using.

*b* is a tube secured to the bottom of the tray A, as plainly shown in Fig. 2.

*c* is a spindle or shaft which rotates and slides vertically in tube *b*.

Upon the spindle or shaft *c* is secured the horizontal arm *d*, having a pivoted handle or knob, *e*, at its outer end.

*f* is a right-angular arm or elbow, the horizontal end of which is fitted to vibrate freely upon the spindle *c*, while the vertical part is hollow or tubular, as plainly shown in Fig. 2.

B is a bracket, the part *g* being hollow. *h* is a horizontal part thereof, while the part *i* is fitted to revolve freely in the hollow part of the elbow *f*, a screw-nut, *j*, fitted upon the stem *i* serving to hold it in place.

*k* is the cutting-blade, which is formed with an angle, as if constructed of two intersecting planes, as clearly shown in Figs. 1 and 2. This knife is centrally attached to the vertical spindle *l*, which passes through the hollow bar *g* of the bracket B, and also through a slot, *o*, in the arm *d*, as shown, a cap-nut serving to hold it in place.

*n* is a spring, one end of which is secured to the bracket *f*, while the other is secured by a small pin, *p*, in the tube *g*, as shown in Fig. 1.

*r* is a scraper, which, following the knife *k* as it passes around the vessel, serves to detach the adhering particles from its sides, in order that the knife may act upon them with greater effect.

As the spindle *l* slides freely in the slot *o*, and as the elbow *f* and the arm *h* of bracket B are at an angle with each other, therefore the tendency of the spring *n* is to press the knife outward or against the side of the vessel, as before stated.

In use the cutting attachment may be raised to any desired height, as the spindle *c* slides freely up and down in the tube *b*, when, by means of the knob *e* and the arm *d*, the whole may be rotated relatively to the vessel, whereby the knife *k* will, by its contact with the material to be cut, rotate upon its own axis, thereby constantly acting upon and reducing to particles whatever is being cut; and as the rotation goes on the knife and connected parts will move slowly downward, thereby acting upon the entire mass. By reason of the peculiar form of the knife it will not run between the large particles, but will subdivide them with efficient certainty.

Having thus described my invention, I claim as new—

1. In a meat and vegetable chopper, a cutting knife or blade made angular in cross-section, and having its perimeter of substantially oval form and brought to a cutting-edge, as shown and described.

2. In a meat and vegetable chopper, the combination, with an inclosing-vessel, of an inclined rotating cutting-blade adapted to divide the material between it and the sides and bottom of the vessel, a shaft or axis for the blade, a central shaft or main axis, and a support for the blade-shaft connected to the central shaft or main axis, substantially as described.

3. In a meat and vegetable chopper, the combination of an inclosing-vessel, an inclined cutting-blade mounted upon a shaft or axis of rotation which is supported by a horizontal arm attached to a vertical central shaft or main axis of rotation, and a spring which operates to press the cutting-blade toward the side of the vessel, substantially as described.

4. In a meat and vegetable chopper, the combination of an inclosing-vessel, an inclined cutting-blade mounted therein upon a shaft or axis of rotation which is supported by a horizontal arm attached to a vertical central shaft or main axis of rotation, and an arm or handle connected to the central shaft or main axis, and also to the axis or shaft of the cutting-blade, whereby to rotate the blade around within the vessel upon the main axis, and also cause it to rotate on its own axis by contact with the material in the vessel, substantially as described.

5. In a meat and vegetable chopper, the combination of an inclosing-vessel, an inclined cutting-blade mounted therein upon a shaft or axis of rotation which is supported by a horizontal arm attached to a vertical central shaft or main axis of rotation, an arm or operating-handle connected to the central shaft and slotted to receive the upper end of the shaft or axis of the cutting-blade, and a spring operating to force the blade against the side of the vessel, substantially as described.

6. In a meat and vegetable chopper, the combination of an inclosing-vessel, an inclined rotary cutting-blade mounted upon a shaft or axis of rotation which is supported by an arm attached to a central shaft or main axis of rotation, an arm or operating-handle connected to the central shaft and also to the shaft of the cutting-blade, and a scraper connected to the operating-handle, substantially as described, for the purpose specified.

7. In a meat and vegetable chopper, the combination, with an inclosing-vessel and a vertical central shaft or main axis, of a cutting-blade mounted upon an independent axis or shaft which has its bearing in an arm connected to the vertical central shaft, and an operating arm or handle connected to the shaft or axis of the cutting-blade and adapted to rotate the latter about the main axis, substantially as described.

8. In a meat and vegetable chopper, the combination, with a circular tub or inclosing-vessel, of a vertically-adjustable central shaft, a horizontal arm connected to said shaft and carrying a rotary cutting-blade, substantially as described.

9. In a meat and vegetable chopper, the combination, with the circular tub or inclosing-vessel, of a vertically-adjustable central shaft or main axis, a horizontal arm connected to said shaft and carrying a rotary cutting-blade, and an arm or operating-handle, also connected to said central shaft and to the top of the cutting-blade, substantially as described.

10. The combination of the knife *k*, bracket B, elbow *f*, spring *n*, arm or lever *d*, and shaft *c*, substantially as described and shown.

WILLIAM H. PEIRCE.

Witnesses:
JOSEPH WHITAKER,
C. W. RICE.